(12) United States Patent
Beamish et al.

(10) Patent No.: US 6,445,732 B1
(45) Date of Patent: Sep. 3, 2002

(54) DYNAMIC RANGE REDUCTION CIRCUITRY FOR A DIGITAL COMMUNICATIONS RECEIVER

(75) Inventors: Norman J. Beamish, Costa Mesa; Robert K. Perez, Laguna Beach, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/159,328

(22) Filed: Sep. 23, 1998

(51) Int. Cl.[7] .......................... H04B 3/46; H04B 17/00; H04Q 1/20
(52) U.S. Cl. .................. 375/224; 455/226.1; 455/249.1
(58) Field of Search .................................. 375/345, 316, 375/324, 377, 224, 227, 344, 340; 455/232.1, 234.1, 249.1, 250.1, 254, 309, 242.2, 134, 212, 67.1, 245.2, 226.2; 370/207; 341/131; 704/200; 360/30; 329/327; 700/37

(56) References Cited

U.S. PATENT DOCUMENTS

| | | | | |
|---|---|---|---|---|
| 4,191,995 A | * | 3/1980 | Farrow | 700/37 |
| 4,313,215 A | * | 1/1982 | Jansen | 455/212 |
| 4,959,620 A | * | 9/1990 | Honjo | 329/327 |
| 4,969,207 A | * | 11/1990 | Sakamoto et al. | 455/134 |
| 4,994,928 A | * | 2/1991 | Honjo et al. | 360/30 |
| 5,235,671 A | * | 8/1993 | Mazor | 704/200 |
| 5,321,849 A | * | 6/1994 | Lemson | 455/67.1 |
| 5,384,547 A | * | 1/1995 | Lynk, Jr. et al. | 330/136 |
| 5,444,697 A | * | 8/1995 | Leung et al. | 370/207 |
| 5,457,811 A | * | 10/1995 | Lemson | 455/67.1 |
| 5,519,888 A | * | 5/1996 | Hall et al. | 455/249.1 |
| 5,551,072 A | * | 8/1996 | Watanabe | 455/226.2 |
| 5,659,582 A | * | 8/1997 | Kojima | 375/345 |
| 5,745,061 A | * | 4/1998 | Norsworthy et al. | 341/131 |
| 5,758,271 A | * | 5/1998 | Rich et al. | 455/234.1 |
| 5,862,465 A | * | 1/1999 | Ou | 455/234.1 |
| 5,930,304 A | * | 7/1999 | Hollenbeck et al. | 375/316 |
| 5,946,607 A | * | 8/1999 | Shiino et al. | 455/234.1 |
| 6,032,031 A | * | 2/2000 | Takaki | 455/245.2 |
| 6,052,566 A | * | 4/2000 | Abramsky et al. | 455/67.1 |

* cited by examiner

*Primary Examiner*—Jean Corrielus
(74) *Attorney, Agent, or Firm*—Procopio, Cory, Hargreaves & Savitch, LLP

(57) ABSTRACT

A method and apparatus which reduces the computational complexity of a receiver subject to power swings in excess of the power swings inherent in wireless communication from normal fading. To accomplish this, attenuation or some other form of signal modification occurs prior to the digital circuitry to reduce the required resolution of the analog to digital converter and other receiver components. A power signal estimator in conjunction with an attenuation control module may control the level of attenuation.

12 Claims, 8 Drawing Sheets

US 6,445,732 B1

DYNAMIC RANGE REDUCTION CIRCUITRY FOR A DIGITAL COMMUNICATIONS RECEIVER

FIELD OF THE INVENTION

This invention relates generally to a digital communications receiver, and more specifically, to a method and apparatus for reducing the required dynamic range of the digital communications receiver.

BACKGROUND

Wireless communication systems have grown tremendously in popularity and are a widely used link in today's modern communications systems. In general, wireless communications systems comprise a base unit and one or more mobile units serviced by the base unit. Each of the mobile and/or base units comprise a receiver and a transmitter. The information that is exchanged via these base and mobile units may include, for example, voice or data information. One example of a wireless communications system is a cordless telephone system which can be found in many homes and businesses. Another is a cellular phone system.

One problem that currently exists in wireless communications systems is the variation in received signal power resulting from variations or changes in distance between receivers and transmitters in the system. For example, in a wireless communications system comprising a cordless telephone and an associated base unit, the power of the signal received by the cordless phone (mobile unit) is significantly greater when the phone is proximate the base unit than it is when the phone is remote from the base unit. In many cases, this variation in received signal power may be of the same order of magnitude as the variation in signal power due to fading, i.e., 60 dB.

This variation in received signal power translates into a wider dynamic range requirement of receivers employed in the system. For example, in a wireless communications system in which the variation in power due to fading is about 60 dB, and that due to variations in distance between the transmitter and receiver is about 40 dB, the required dynamic range of the receiver is about 100 dB. The increase in the required dynamic range due to distance variations is about 40 dB.

This increase in the required dynamic range of the receiver translates into a receiver which is more complex and expensive, and consumes more power and space than a receiver not subject to this requirement. The problem is particularly acute for digital receivers in which an analog-to-digital (A/D) converter is employed to convert the received signal into a digital format. The increase in the dynamic range requirement directly translates into increased cost, space, and power consumption of the A/D converter. However, for many markets, such as the consumer market, the increase in cost, space, and power consumption which results makes it infeasible to use a digital receiver in the wireless communications system. Although these increases can be offset somewhat by reducing the resolution of the A/D converter, e.g., from 16 to 8 bits, in many cases this results in unacceptable deterioration of signal quality.

Accordingly, an object of the subject invention is a method and apparatus for reducing the required dynamic range of a digital communications receiver configured for use in a wireless communications system without significant deterioration in signal quality.

Another object is a method and apparatus which overcomes the disadvantages of the prior art.

Further objects include utilization or achievement of the foregoing objects alone or in combination.

Additional objects and advantages are set forth in the description which follows or will be apparent to those of ordinary skill in the art who practice the invention.

SUMMARY OF THE INVENTION

To achieve the foregoing objects, and in accordance with the purpose of the invention as broadly described herein, there is provided a digital communications receiver comprising: an antenna for receiving a signal; a demodulator coupled to the antenna for demodulating the signal to obtain an information signal, the information signal having a dynamic range; a signal level adjustment circuit coupled to the demodulator for adjusting the signal level of the information signal; a control circuit coupled to the signal level adjustment circuit for controlling the same responsive to a parameter of the received signal; a digitizer for digitizing the reduced signal to obtain a digital signal, the digital signal having an amplitude; and a scaling circuit scaling the digital signal. A related method and computer readable media are also provided.

It is contemplated that the present invention may find application in a number devices including but not limited to cordless telephones, cellular telephones, whether CDMA, GSM, or TDMA, two-way radio systems, package or personal tracking devices, personal communications devices, wireless remote controls, baby monitors, and other wireless communications devices.

DETAILED DESCRIPTION OF THE PREFERRED EMBODIMENTS

1. Example Environment Of The Subject Invention

Figure 1B:
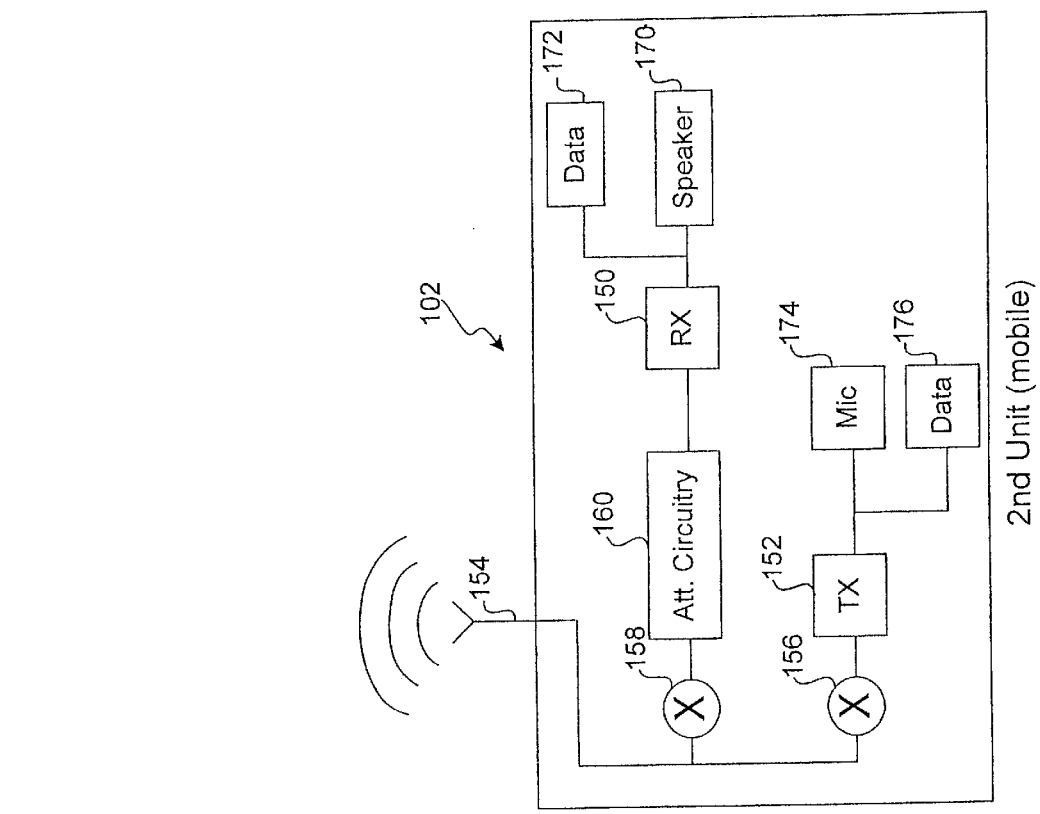
FIG. 1B is a block diagram of an example mobile unit of the subject invention.
Figure 1A:
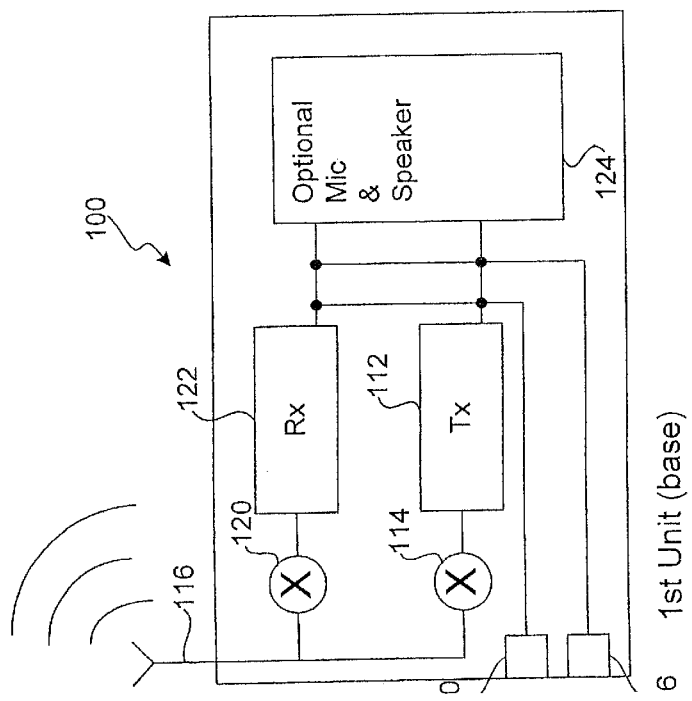
FIG. 1A is a block diagram of an example base unit of the subject invention.

An exemplary environment in which the subject invention can be beneficially employed is a cordless telephone system, the major components of which are illustrated in FIGS. 1A and 1B. As can be seen, the system comprises a base unit 100 and one or more mobile handsets 102 serviced by the base unit. Base unit 100 is generally stationary, and mobile handsets 102 are capable of being moved in relation to the base unit. Although systems are possible in which multiple handsets and multiple base units are employed, in the ensuing discussion, it will be assumed that the system comprises a single handset and base unit.

Communication systems of this nature commonly operate at 900 MHz frequency. Power is provided to the mobile unit via a battery pack or other similar power source. The distance between the mobile unit and base unit may vary between a few feet, such as when the caller is standing right next to the base unit, to 1000 feet or more.

Base Unit

The base unit 100 includes a primary jack 110 which is coupled to transmitter circuit 112 and receiver circuit 122. In addition, the primary jack is coupled to a wire-based system such as a public switched telephone network (PSTN), which is not shown. Transmitter circuit 112 is coupled to a modulator 114, which in turn is coupled to an antenna 116. The antenna 116 is also coupled to a demodulator 120 and the demodulator is coupled to receiver circuit 122. Both the receiver circuit 122 and transmitter circuit 112 are optionally coupled to combined microphone and speaker 124 which support a speaker phone feature. Receiver circuit 122 is also coupled to a secondary jack, identified with numeral 126, as may be required to connect the base unit 100 to an answering machine (not shown). Together, the antenna 116, demodulator 120, and receiver circuit 122 comprise what is commonly known as a receiver, and antenna 116, modulator 114, and transmitter circuit 112 comprise what is commonly known as a transmitter.

In a transmission from the base unit to the mobile unit, transmitter circuit 112 receives an information signal, either from the primary jack, the secondary jack, or the microphone component of element 124. Then, the transmitter circuit prepares the signal for transmission over a wireless medium, and passes the same to modulator 114. The modulator 114 modulates the signal onto an RF carrier frequency and passes the modulated signal to the antenna 116. The antenna 116 transmits the modulated signal to mobile unit 102.

In a transmission from the mobile unit to the base unit, the antenna 116 receives a modulated signal, and passes the same to demodulator 120. The demodulator 120 demodulates the signal to provide an information signal and provides the same to receiver circuit 122. Receiver circuit 122 then processes the signal and provides the resulting signal to either the primary jack, the secondary jack, or the speaker component of element 124.

Mobile Unit

The mobile unit 102 includes receiver circuit 150, transmitter circuit 152, antenna 154, modulator 156, demodulator 158, attenuation circuit 160, optional data port 172, speaker 170, microphone 174, and optional data port 176. The attenuation circuit 160 is part of the subject invention, and is described in greater detail below in relation to FIGS. 2–6. It is fully contemplated that the attenuation circuit 160 shown in the mobile unit 102 may reside in either or both of the base unit 100 and mobile unit 102.

The antenna 154 is coupled to demodulator 158 which is turn is coupled to attenuation circuit 160. Attenuation circuit 160 is also coupled to receiver circuit 150 which in turn is coupled to data port 172 and speaker 170. Microphone 174 and data port 176 are coupled to transmitter circuit 152, which in turn is coupled to modulator 156. Modulator 156 is then coupled to antenna 154. Together, antenna 154, demodulator 158, attenuation circuitry 160, and receiver circuit 150 comprise a receiver, and antenna 154, modulator 156, and transmitter circuit 152 comprise a transmitter.

In a transmission from the base unit to the mobile unit, a signal is received by antenna 154 and provided to demodulator 158. Demodulator 158 demodulates the signal to obtain an information signal, and provides the same to attenuation circuit 160. In accordance with the subject invention, attenuation circuit 160 attenuates the signal in a manner to be described below in relation to FIGS. 2–6 and provides an attenuated signal to receiver circuit 150. Receiver circuit 150 processes the signal, and provides the resulting signal to the speaker 170 for voice reproduction or optionally to data port 172.

In a transmission from the mobile unit to the base unit, an information signal is first obtained either via the microphone 174 or optional data port 176. The information signal is provided to transmitter circuit 152 which processes the signal in preparation for transmission. Transmitter circuit 152 then provides the resulting signal to modulator 156, which modulates the signal onto an RF carrier frequency. The modulator 156 then provides the modulated signal to antenna 154, which transmits it to the base unit.

2. Embodiments Of The Subject Invention

Figure 7:
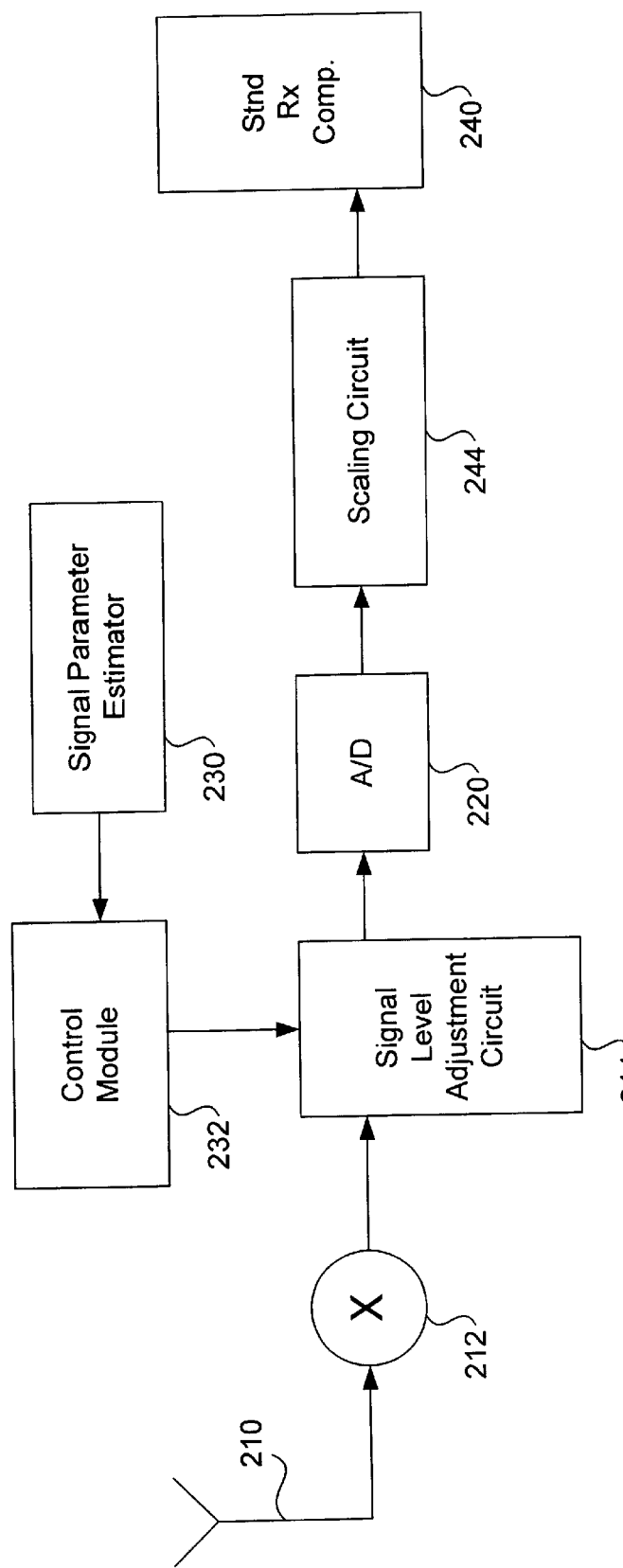
FIG. 7 is a block diagram of the front end of a digital communications receiver in accordance with an embodiment of the invention.

FIG. 7 illustrates a first embodiment of a digital communications receiver in accordance with the subject invention. As shown, an antenna 210 is coupled to a demodulator 212. The output of the demodulator 212 is coupled to a signal level adjustment circuit 214, which has an output coupled to an analog to digital (A/D) converter 220. The output of the A/D is coupled to a scaling circuit 244. The output of the scaling circuit 244 is coupled to receiver circuit 240. A control module 232 is coupled to signal level adjustment circuit 214, and a signal parameter estimator 230 is coupled to the control module 232. Control module 232 controls the level of signal level adjustment performed by signal level adjustment circuit 214 responsive to the output of signal parameter estimator 230. Signal parameter estimator 230 estimates a parameter of the signal representative of received signal power. Consequently, signal level adjustment circuit 214 is configured to reduce the power of the incoming signal from demodulator 212 responsive to the estimate of the parameter of the incoming signal. This circuitry can be beneficially employed in either of the base unit 100 or the mobile unit 102 in the example environment discussed above in relation to FIG. 1.

A/D converter 220 digitizes the signal provided by signal level adjustment circuit 214. The scaling circuit 244 is configured to adjust or scale the digital samples of the digitized signal provided by A/D converter 220. The scaling circuit 244 adjusts the average power of the digital signal to be at or close to a pre-set level. Accordingly the scaling circuit 244 changes the amplitude of the incoming signal from A/D converter 220 to compensate for average power variation due to fading and other short term influences on the amplitude of the signal. Receiver circuitry 240 is standard circuitry found at the back end of digital communications receivers.

In operation, the antenna 210 receives a signal and passes the same to demodulator 212. Demodulator 212 demodulates the incoming signal to remove the carrier frequency therefrom and obtain an information signal. Signal level adjustment circuit 214 receives the information signal and adjusts the power level thereof at a level controlled by control module 232 responsive to an input from signal parameter estimator 230, which estimates a parameter of the signal that is used to select a signal level adjustment. Control module 232 receives this parameter estimate from signal parameter estimator 230, and responsive thereto, it controls the level of signal level adjustment undertaken by signal level adjustment circuit 214. The reduced signal produced by signal level adjustment circuit 214 is then passed to A/D converter 220. A/D converter 220 receives the adjusted signal and produces therefrom a digital signal. Scaling circuit 244 receives the digital signal and adjusts the average power of the digital signal responsive to a pre-set value. In one embodiment the pre-set value is dependant on the type of circuitry in receiver components 240. Accordingly, scaling circuit 244 adjusts the average power of the signal to be at or close to a level desired by receiver componentry 240. The scaled signal is then provided to standard backend receiver circuitry 240. Other standard components (not shown) may provide the signal to a speaker or other device.

Figure 8:
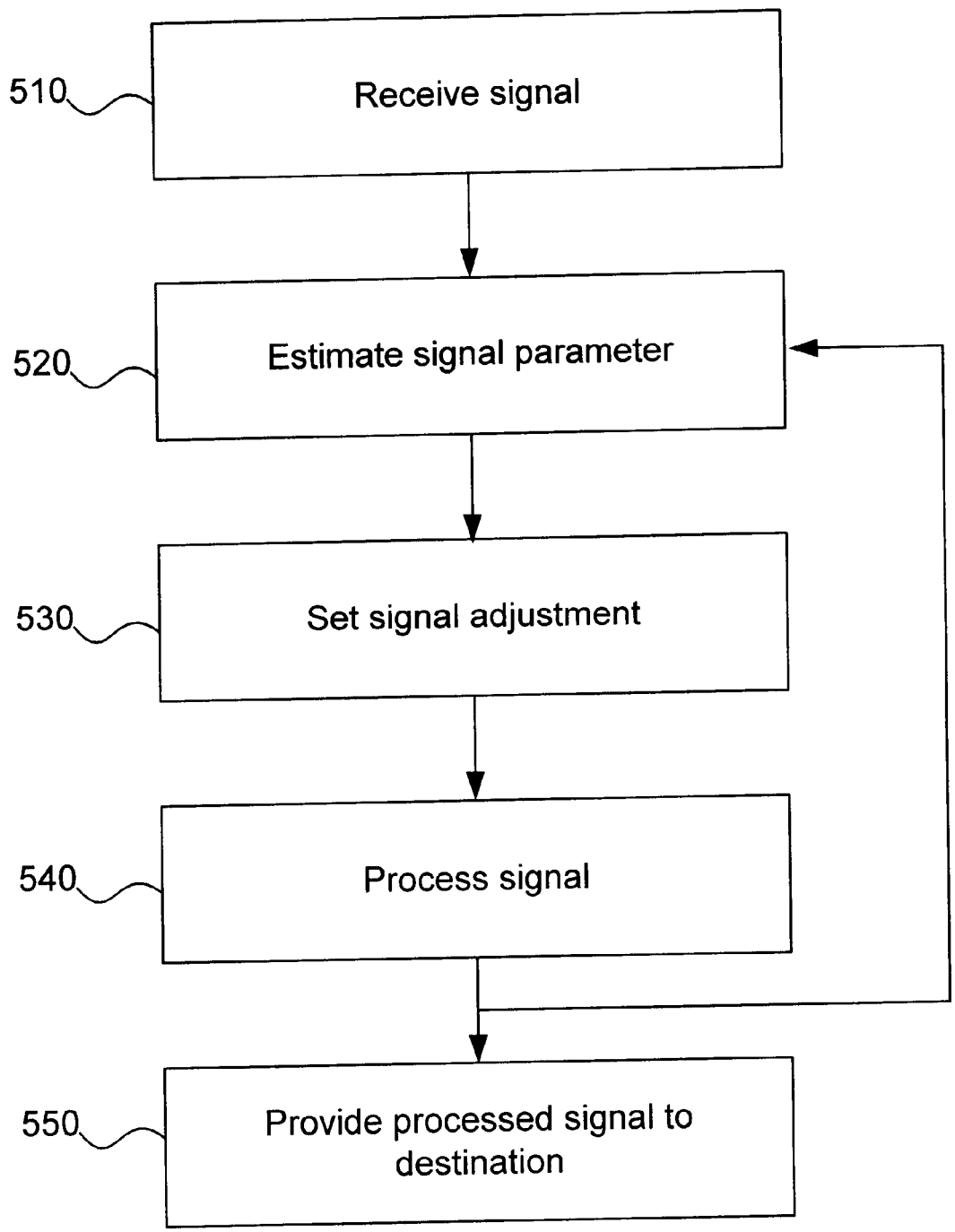
FIG. 8 is an operational flow diagram illustrating operation of one embodiment of the subject invention.

A method of operation of this embodiment is illustrated in FIG. 8. As shown, in step 510, an incoming signal from a corresponding transmitter is received and demodulated. Next, in step 520, a parameter of the signal is estimated. Responsive to this estimate, in step 530, a signal adjustment level is determined. In step 540, the power of the signal is adjusted by the level determined in step 530. In addition, the signal is digitized. During this step, the power level of the digital signal is scaled to compensate for fading which has occurred in the signal. Additional processing may also be performed in this step, including, for example, removal of certain transmitting codes and decompression. Concurrently with the execution of steps 520, 530, and 540, the parameter of the incoming signal is periodically if not continuously estimated, and the level of signal adjustment performed responsive to this estimate. Such is indicated by the loop back to step 520 from step 540 in FIG. 8. The purpose is to ensure that the proper adjustment is applied to the incoming signal at substantially all times, and to prevent saturation of downstream receiver components. Finally, in step 550, the signal is provided to its desired destination, e.g., a speaker or a data port. These steps are performed for the substantial duration of time that a communications link is established between the transmitter and receiver.

Figure 2:
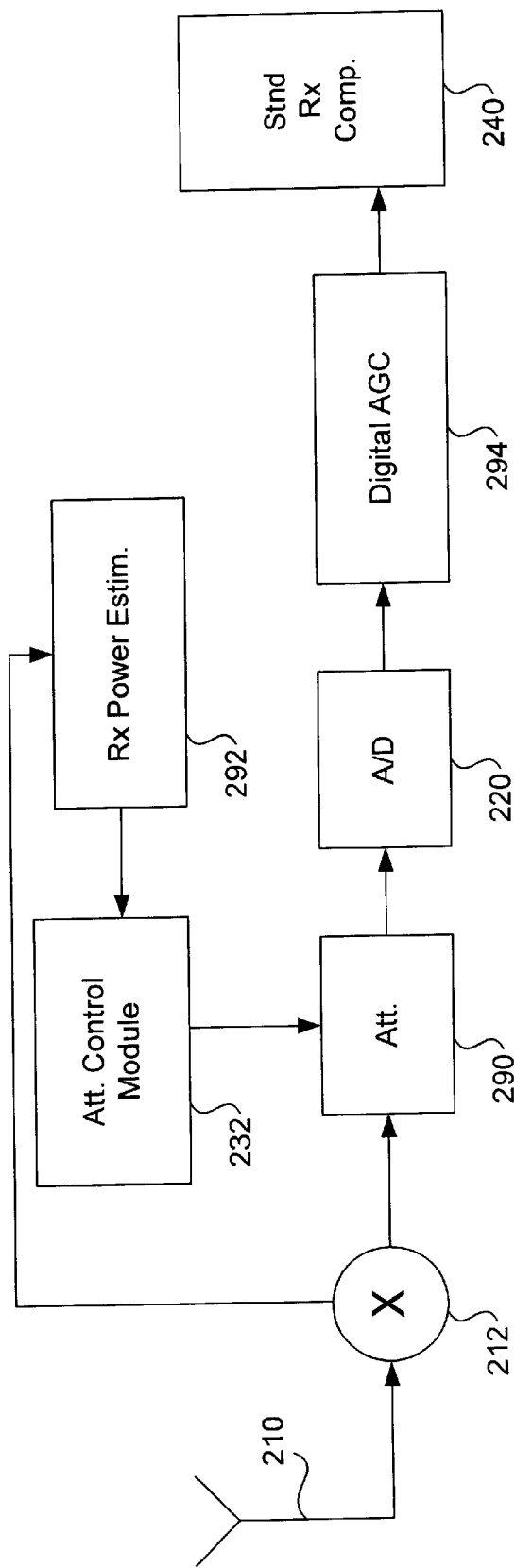
FIG. 2 is a block diagram of the front end of a digital communications receiver in accordance with an embodiment of the subject invention.

FIG. 2 illustrates a second embodiment of a digital communications receiver in accordance with the subject invention. As shown, an antenna 210 is coupled to a demodulator 212. The output of the demodulator 212 is coupled to attenuation circuit 290, which has an output coupled to an analog to digital A/D converter 220. The output of the AID converter 220 is coupled to a digital automatic gain control (AGC) circuit 294 as is commonly found in wireless communication receivers. The output of AGC circuit 294 is coupled to receiver circuit 240. An attenuation control module 232 is coupled to attenuation circuit 290, and a power estimator 292 is coupled to the attenuation control module 232. Attenuation control module 232 controls the level of attenuation provided by attenuation circuit 290 responsive to the output of power estimator 292. Power estimator 292 estimates the strength of the demodulated signal provided by demodulator 212. Consequently, attenuation circuitry 290 is configured to attenuate the amplitude of the incoming signal from demodulator 212 responsive to the signal strength of the incoming signal. This circuitry can be beneficially employed in either of the base unit 100 or the mobile unit 102 in the example environment discussed above in relation to FIG. 1.

AID converter 220 digitizes the signal provided by attenuation circuit 290 and forwards the signal to the AGC circuit 294. AGC circuit 294 is configured to scale the average power level of the digitized signal provided by A/D converter 220 responsive to receiver components 294. Accordingly, AGC circuit 294 adjusts or scales the amplitude of the incoming digitized signal to compensate for fading that inherently occurs in wireless communication systems. Receiver circuitry 240 is standard circuitry found at the back end of digital communications receivers.

In operation, the antenna 210 receives a signal and passes the same to demodulator 212. Demodulator 212 demodulates the incoming signal to remove the carrier frequency therefrom and obtain an information signal. Attenuation circuit 290 receives the information signal and attenuates the amplitude thereof at an attenuation level controlled by the attenuation control module 232 responsive to an input from receiver power estimator 292, which estimates the power of the demodulated signal from demodulator 212. The attenuation control module 232 receives this estimate of power from power estimator 292, and responsive thereto, it controls the level of attenuation undertaken by attenuation circuit 290 such that the level of attenuation is determined by the strength of the incoming signal.

The attenuated signal produced by attenuation circuit 290 is then passed to A/D converter 220. A/D converter 220 receives the attenuated signal and produces therefrom a digital signal. AGC 294 receives the digital signal and adjusts the average power of this signal to be at or close to a preset level. Accordingly, the AGC 294 changes the amplitude of the incoming signal from A/D 220 to compensate for signal variation due to fading and other short term influences on amplitude. The scaled signal from the AGC 294 is then provided to standard backend receiver circuitry 240. Other standard components (not shown) may provide the signal to a speaker or other device.

Figure 5:
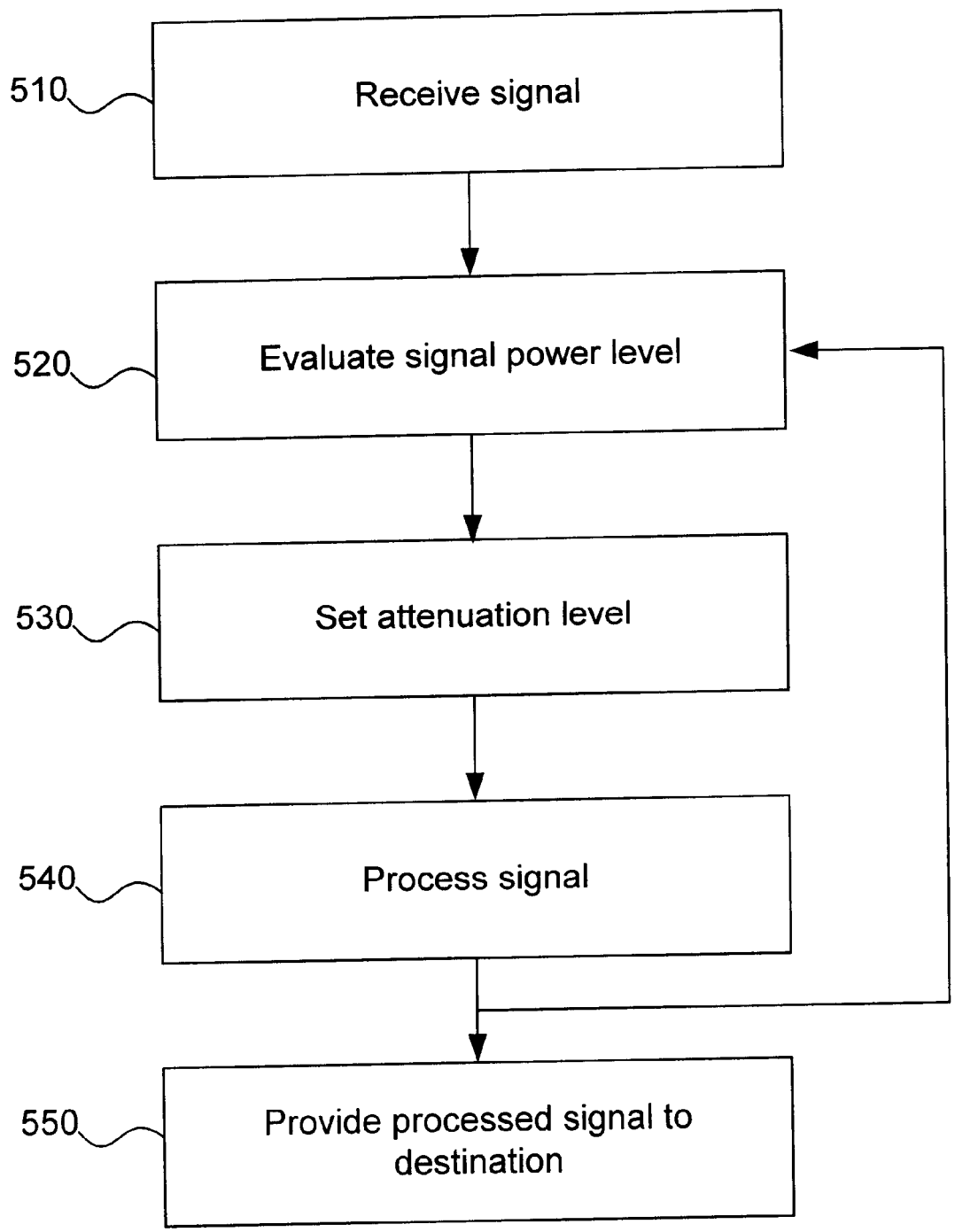
FIG. 5 is an operational flow diagram illustrating operation of one embodiment of the present invention.

A method of operation of this embodiment is illustrated in FIG. 5. As shown, in step 510, an incoming signal from a corresponding transmitter is received and demodulated. Next, in step 520, the power level of the signal is estimated. Responsive to this estimate, in step 530, an attenuation level is determined. In step 540, the signal is attenuated at the level of attenuation determined in step 530. In addition, the signal is digitized. The AGC 294 adjusts the amplitude of the digitized signal to bring the average power of the signal to a pre-set level which thereby compensates for signal fading. Additional processing may also be performed in this step, including, for example, removal of certain transmitting codes and decompression. Concurrently with the execution of steps 520, 530, and 540, the power of the incoming signal is periodically if not continuously estimated, and the level of attenuation determined responsive to this estimate. Such is indicated by the loop back to step 520 from step 540 in FIG. 5. The purpose is to ensure that the proper attenuation level is applied to the incoming signal at substantially all times, and to prevent saturation of downstream receiver components. Finally, in step 550, the signal is provided to its desired destination, e.g., a speaker or a data port. These steps are performed for the substantial duration of time that a communications link is established between the transmitter and receiver.

The subject invention results in a decrease in the required dynamic range of a digital communications receiver incorporating the invention. That in turn leads to a receiver which is less expensive, consumes less power, and requires less space than a receiver not incorporating the invention. For example, consider a system in which the required dynamic range of a receiver is 100 dB because of power variations due to fading and distance variations between the receiver and transmitter. Assuming an audio telephone application utilizing spread spectrum coding in which 16 bits of resolution is required to handle the 100 dB dynamic range, the A/D converter in such a system must be capable of providing 5 Msamples/sec. @ 16 bits/sample, or 80 Mbits/sec. That is to be contrasted with a system incorporating the subject invention in which the required dynamic range is reduced to 60 dB. Again assuming an audio telephone application in which only 10 bits of resolution is required to handle the 60 dB dynamic range, the A/D converter in such a system need only be capable of handling 50 Mbits/sec. The reduction in required bandwidth and bit resolution allows use of an A/D converter which is less expensive, consumes less power, and consumes less space than an A/D converter capable of greater bandwidth and resolution.

EXAMPLE

In an exemplary embodiment, the estimate of signal strength determined by receiver power estimator 292 is a received signal strength indicator (RSSI), an average measurement of signal strength determined by averaging the signal received from demodulator 212 over a predetermined time period. In this exemplary embodiment, the predetermined time period is advantageously in the range of about 0.5 seconds to about 3 seconds. Based on the RSSI, the attenuation control module 232 estimates the location of the receiver in relation to the transmitter. One of three possible categories are determined: short range, mid-range, and long-range. The long-range category is determined if the RSSI is approximately two-thirds or more of the total variation in power of the incoming signal attributable to the combined efforts of fading and variations or changes in distance between the transmitter and receiver. The mid-range category is chosen if the RSSI is between about two-thirds and about one-third of the total power variation. The short range category is selected if the RSSI is less than about one-third of the total power variation.

Based on the category which is selected, the attenuation level which should be applied is determined. For the short range category, the attenuation level to be applied is about 40 dB; for the mid-range category, the attenuation level selected is about 20 dB; and for the long range category, the attenuation level selected is about 0 dB.

It is further contemplated that the thresholds power levels between short range, mid-range, and long range be determined to prevent excessive attenuation level changes. To achieve this objective, advantageously, information such as the history of past attenuation levels and/or distance categories is stored in a memory, and the next distance category and thus attenuation level determined responsive to this information as well as the RSSI. Thus, in the exemplary embodiment, if the RSSI indicates a transition to a distance category with a higher attenuation level, the actual threshold level at which the transition to the second distance category becomes effective is greater than the case in which the RSSI indicates a transition from the second distance category to the first distance category. In accordance with the foregoing, in the exemplary embodiment, the threshold used to transition from a short range to mid-range distance category is greater than the threshold used to transition from the mid-range to short range distance category. In one example, the threshold level used to transition from the short range to mid-range distance categories is 0.4 of the total power variation, while the threshold level used to transition from the mid-range to short range distance levels is 0.3 of the total power variation. This staggering of threshold levels is referred to as hysteresis.

In the exemplary embodiment, the attenuation control module 232 instructs the attenuation circuit 290 to attenuate the incoming signal at an attenuation level selected from about 40 dB, about 20 dB, or about 0 dB based on the selected distance category. The attenuation level corresponding to the short range category is about 40 dB; that corresponding to the mid-range category is about 20 dB; and that corresponding to the long range category is about 0 dB.

Figure 3:
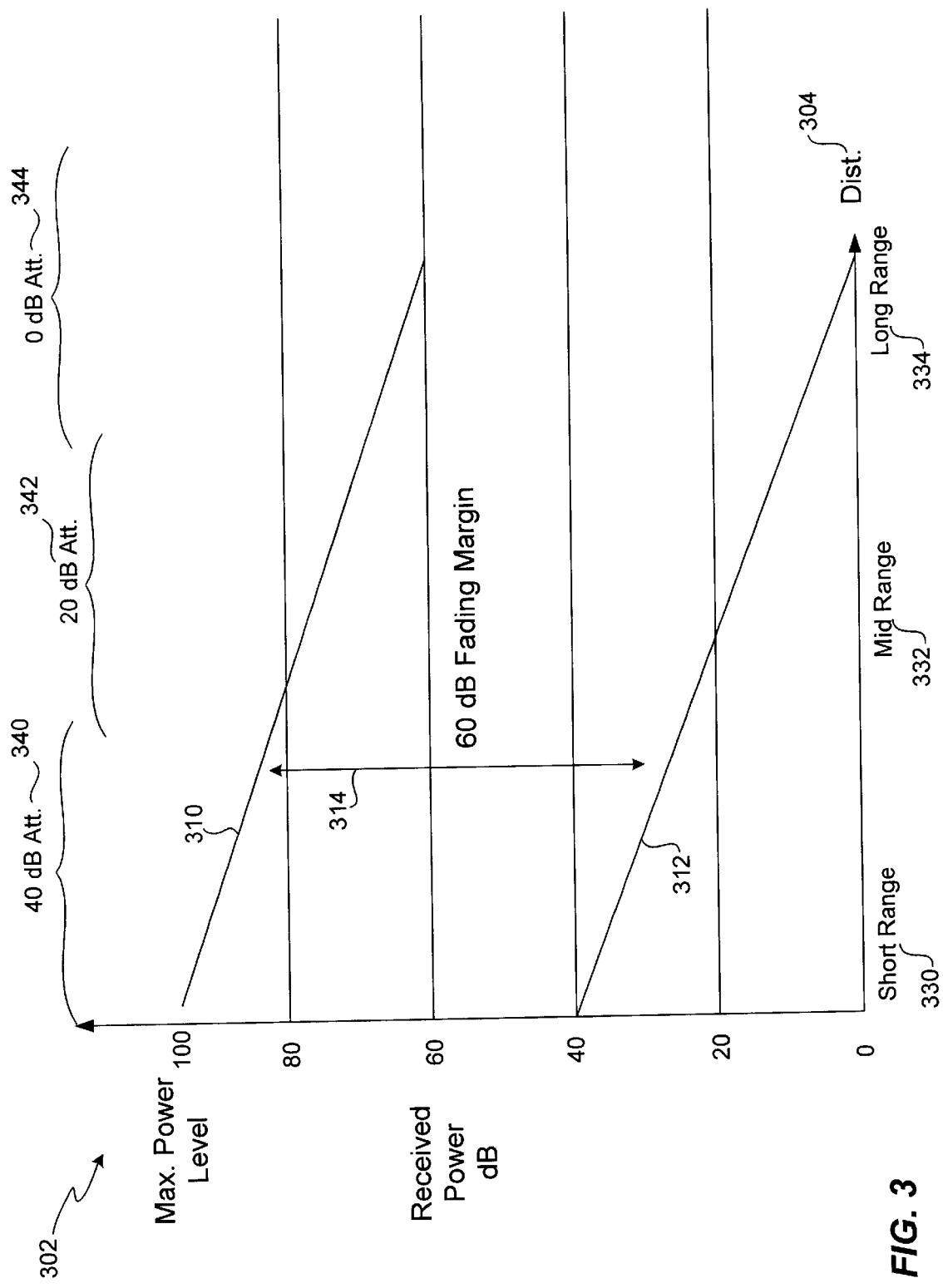
FIG. 3 is a generalized graph of received power intensity versus transmission distance in a wireless communication system.

The foregoing principles are illustrated in FIG. 3, which represents a plot of received signal power versus distance of the receiver from the transmitter in a typical cordless telephone system. The vertical axis 302 corresponds to received signal power, and the horizontal axis 304 corresponds to distance between the receiver and transmitter. In this example, 100 dB is the maximum received power. As shown, the horizontal axis is labeled with the three predetermined distance categories, short range, mid-range, and long range, indicated with identifying numerals 330, 332, and 334 respectively. At the top of the figure, the horizontal axis is also labeled with the attenuation levels, about 40 dB, about 20 dB, and about 0 dB, indicated with identifying numerals 340, 342, and 344 respectively, corresponding to each of the predetermined distance categories. Line 310 represents a plot of maximum received power strength as a function of distance between the receiver and transmitter, while line 312 represents a plot of minimum received power strength as a function of distance between the receiver and transmitter. As can be seen, the two lines are vertically displaced relative to one another by about 60 dB, the variation in received power strength due to fading.

The difference between the minimum and maximum received signal power for a given distance category defines the variation in received signal power for that category. Thus, for the short range category, identified in the figure with numeral 330, the variation in received signal power is about 40 dB to about 100 dB, and the attenuation level corresponding to this category is about 40 dB; for the mid-range category, identified in the figure with numeral 332, the variation in received signal power is between about 20 dB to about 80 dB, and the attenuation level corresponding to this category is about 20 dB; and for the long range category, the variation in received signal power is between about 0 dB to about 60 dB, and the attenuation level corresponding to this category is about 0 dB.

In this exemplary embodiment, AGC 294 monitors the digital samples and adjusts their values to thereby compensate for fading in a wireless communication system. To achieve this objective, in the exemplary embodiment, the level of scaling performed by AGC 294 is undertake to cause the average power of the digital samples to approximate a pre-set level. In one variation the pre-set level depends on the receiver components 240.

Figure 4:
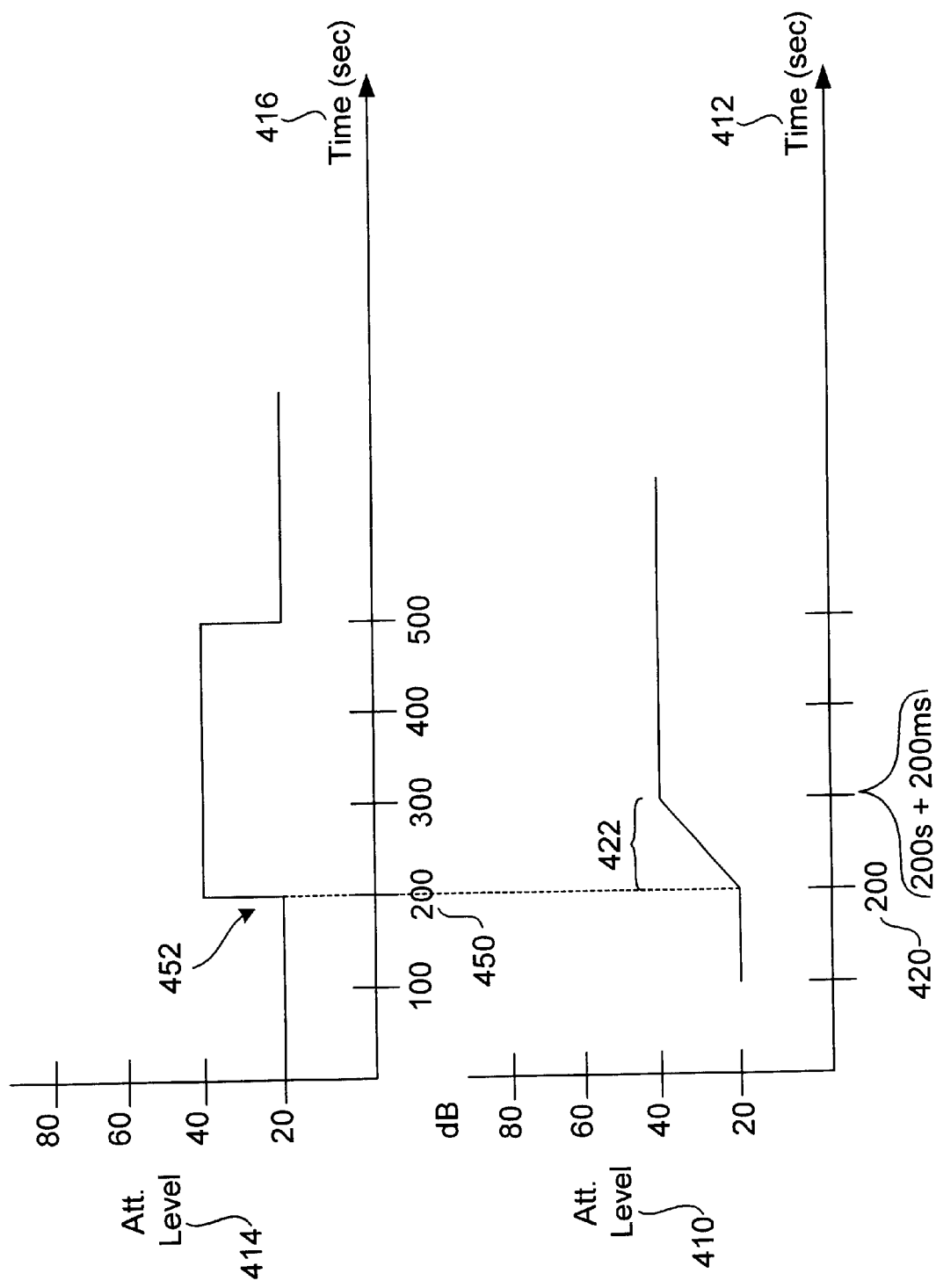
FIG. 4 is a comparative plot of attenuator response time and automatic gain control response time in an exemplary embodiment of the subject invention.

FIG. 4 illustrates the rate at which the attenuator changes the power level of the incoming signal. The upper graph illustrates the incoming attenuation level 414 versus time 416 in seconds. The lower graph illustrates attenuation level 410 versus time 412 in milliseconds. As shown, at time 200 seconds, reference number 450, the attenuation level changes from 20 dB to 40 dB. On a time scale 416 of seconds, the increase in attenuation appears as a vertical line 452. However, as shown in the lower graph, the rate of change in attenuation level is selected to increase generally slowly in time as compared to the response time or slew rate of the AGC. In one variation the attenuation level changes over a period of approximately 200 milliseconds, shown in period 422. In this variation this is a generally slow rate attenuation introduction. In contrast, a rate of change in power level due to fading is generally 20 dB per 100 milliseconds. Thus, in one variation the attenuation occurs gradually over a period of time larger than the average fade margin.

By configuring the attenuator 290 to generally slowly introduce an attenuation step into the incoming signal the attenuation appears as slow fading to AGC 294. This desirably allows AGC 294 to accurately track the short term changes in average power level in the digital signal arriving at the AGC. For example, in the exemplary embodiment, the response time or slew rate of AGC 294 is greater than that of attenuation circuit 290 to ensure that the scaling level of AGC 294 accurately tracks the signal.

Figure 6:
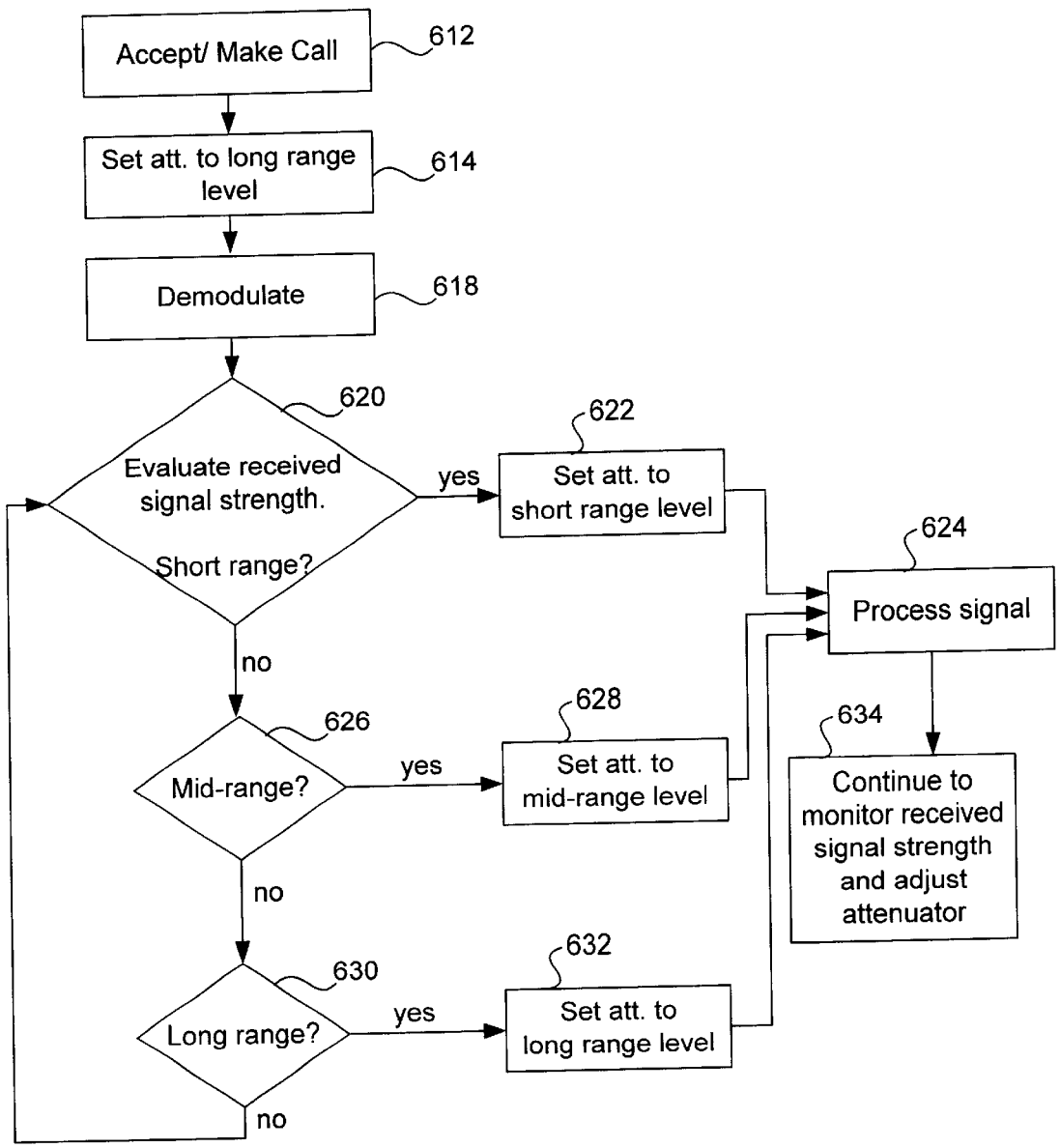
FIG. 6 is an operational flow diagram illustrating operation of the attenuation level decision process of one embodiment of the present invention.

FIG. 6 is a flow chart depicting a method of operation of the exemplary embodiment. In step 612, a call is made or accepted. At the initiation of the call, as indicated by step 614, it is assumed that the distance between the receiver and transmitter is in the long range category, and thus that the attenuation level is set to about 0 dB. In step 618, the incoming signal representative of the call is received by the receiver and demodulated to isolate the information component of the signal from the carrier component.

Next, in step 620, the power of the demodulated signal from step 618 is evaluated to determine the distance category which is indicated. If the short range category is indicated, in step 620, the attenuation level is set to that corresponding to the short term distance category. If the mid-range category is indicated, in step 628, the attenuation level is set to that corresponding to the mid-range category. If the long range category is indicated, in step 632, the attenuation level is set to that corresponding to the long range category.

Then, in step 624, additional processing on the signal is performed, including attenuating the signal at the attenuation level set in steps 622, 628, or 632, digitizing the signal, and then scaling the signal to compensate for fading.

Throughout the duration of the call, the power of the incoming signal is continuously or at least periodically monitored, and responsive thereto, the distance category and attenuation level readjusted to account for changes in the distance between the receiver and transmitter. Such is indicated by step 634 in FIG. 6.

In the exemplary embodiment, steps 620, 622, 626, 628, 630, and 632 of the foregoing procedure is implemented in computer software executable on one or more digital signal processors (DSP). It is contemplated that such software be provided on computer readable media such as CD-ROMs, floppy disks, or the like. Digital signal processors are known by those of ordinary skill in the art and accordingly need not be described in great detail herein. These one or more DSPs are configured to work in conjunction with attenuation circuit 290 and AGC 294 to process the incoming signal in accordance with the foregoing principles.

In the exemplary embodiment, attenuation circuit 290 is a variable resistance network in which the level of resistance determines the level of attenuation which is performed. In the exemplary embodiment, the level of resistance is determined and controlled by attenuation control module 232.

While embodiments and applications have been shown and described, it should be apparent to those of ordinary skill in the art that the foregoing example is merely illustrative, and that many other embodiments are possible without departing from the spirit and scope of the present invention. Accordingly, the invention is not to be restricted, except as by the appended claims in light of the doctrine of equivalents.

What is claimed is:

1. A digital communications receiver comprising:

an antenna for receiving a signal;

a demodulator coupled to the antenna for demodulating the signal to obtain an information signal;

a signal level adjustment circuit coupled to the demodulator for adjusting the power level of the information signal to provide an adjusted signal;

a control circuit coupled to the signal level adjustment circuit for controlling the same responsive to a parameter of the received signal; wherein the control circuit is a processor configured to compare a parameter estimate with a plurality of predetermined levels that correspond to an estimated location of the receiver in relation to a transmitter that transmitted the signal, and, responsive thereto, controlling the signal level adjustment circuit by selecting one of a plurality of discrete signal adjustment levels, the signal adjustment levels being relatively high when the estimated location of the receiver in relation to the transmitter is relatively close and relatively low when the estimated location of the receiver in relation to the transmitter is relatively distant, the predetermined levels being set in a manner to prevent excessive signal adjustment level changes;

a signal parameter estimator coupled to the control circuit for providing an estimate of the parameter of the received signal to the control circuit;

an analog to digital converter for converting the adjusted signal to a digital signal.

2. The receiver of claim 1 in which the processor is a DSP.

3. The receiver of claim 1 in which the signal level adjustment circuit is an attenuation circuit.

4. A receiver as claimed in claim 1, and further comprising a memory for storing past signal adjustment levels and estimated locations, and wherein the predetermined levels are set responsive to this stored information.

5. A receiver as claimed in claim 4, wherein the threshold for transitioning from a predetermined level corresponding to a relatively close location to one corresponding to a relatively distant location is greater than the threshold for transitioning from a predetermined level corresponding to a relatively distant location to one corresponding to a relatively close location.

6. A digital communications receiver comprising:

an antenna for receiving a signal;

a demodulator coupled to the antenna for demodulating the signal to obtain an information signal;

an attenuator coupled tote demodulator for attenuating the information signal at a variable attenuation level to provide an attenuated signal;

an attenuation control circuit coupled to the attenuator for comparing an estimate of the power of the information signal with at least one predetermined threshold level that corresponds to an estimated location of the receiver in relation to a transmitter that transmitted the signal and responsive thereto, determining the attenuation level of the attenuator, the attenuation level being relatively high when the estimated location of the receiver in relation to the transmitter is relatively close and relatively low when the estimated location of the receiver in relation to the transmitter is relatively distant;

a power estimator coupled to the attenuation control circuit for providing the estimate of power of the information signal to the attenuation control circuit;

an A/D converter for converting the attenuated signal to a digital signal, the digital signal having an amplitude; and an AGC circuit for scaling the average power of the digital signal, wherein the attenuator attenuates the information signal at a rate that allows the AGC circuit to accurately track short term changes in the power of the information signal.

7. A receiver as claimed in claim 6, wherein the response time of the attenuator is slower than the response time of the AGC circuit.

8. A method of operating a digital communications receiver comprising:

receiving a signal;

demodulating the signal to obtain an information signal, the information signal having a signal power level;

providing an estimate of a parameter of the information signal;

comparing the estimate of the parameter of the information signal with a plurality of predetermined levels that correspond to an estimated location of the receiver in relation to a transmitter that transmitted the signal, and responsive thereto, selecting one of a plurality of discrete signal power reduction levels and reducing the power level of the information signal thereto, the power reduction levels being relatively high when the estimated location of the receiver in relation to the transmitter is relatively close and relatively low when the estimated location of the receiver in relation to the transmitter is relatively distant, wherein the predetermined levels are set in a manner to prevent excessive power level changes;

digitizing the reduced signal to provide a digital signal, the digital signal having an average power; and scaling the average power of the digital signal at a slew rate that permits short term changes in the average power to be accurately tracked.

9. A receiver as claimed in claim 8, wherein the predetermined levels are determined with respect to past attenuation levels and estimated locations, and wherein the rate of change in attenuation level is slower relative to the scaling slew rate.

10. A method of operating a digital communications receiver comprising:

receiving a signal;

demodulating the signal to obtain an information signal;

providing an estimate of the power of the information signal;

comparing the estimate of the power of the information signal with at least one predetermined threshold level that corresponds to an estimated location of the receiver in relation to a transmitter that transmitted the signal, and responsive thereto, determining an attenuation level, the attenuation level being relatively high when the estimated location of the receiver in relation to the transmitter is relatively close and relatively low when the estimated location of the receiver in relation to the transmitter is relatively distant, wherein the threshold levels are determined with respect to past attenuation levels and estimated locations in order to prevent excessive attenuation level changes;

attenuating the information signal at the attenuation level to provide an attenuated signal;

converting the attenuated signal to a digital signal.

11. A digital communications receiver comprising:

means for receiving a signal and demodulating the signal to obtain an information signal;

means for estimating a location of the receiver in relation to a transmitter that transmitted the signal;

means for determining an attenuation level responsive to a parameter of the received signal, the attenuation level being relatively high when the estimated location of the receiver in relation to the transmitter is relatively close and relatively low when the estimated location of the receiver in relation to the transmitter is relatively distant, the means for determining an attenuation level also being responsive to past attenuation levels and estimated locations in order to prevent excessive attenuation level changes;

means for attenuating the information signal at the attenuation level to provide an attenuated signal;

means for digitizing the attenuated signal to provide a digital signal, the digital signal having an amplitude; and means for scaling the average power level of the digital signal to within a range of a preset level.

12. The receiver of claim 11 further comprising a means for estimating the power of the information signal and providing the same to the means for determining.

* * * * *

UNITED STATES PATENT AND TRADEMARK OFFICE
CERTIFICATE OF CORRECTION

PATENT NO. : 6,445,732 B1
DATED : September 3, 2002
INVENTOR(S) : Norman J. Beamish and Robert K. Perez It is certified that error appears in the above-identified patent and that said Letters Patent is hereby corrected as shown below:

Column 10,
Line 8, "estimate", insert -- of the received signal --.
Line 21, after "providing", delete "an", and insert -- said parameter --.
Line 21, after "estimate", delete "of the parameter".

Signed and Sealed this

Fifth Day of October, 2004

JON W. DUDAS
*Director of the United States Patent and Trademark Office*